INVENTOR
KARL ILLENBERGER
BY Spiel & Spiel
ATTORNEYS

INVENTOR
KARL ILLENBERGER
BY Spiee & Spiee
ATTORNEYS

INVENTOR
KARL ILLENBERGER
BY [signature] ATTORNEYS

United States Patent Office 3,483,536

Patented Dec. 9, 1969

3,483,536

COINCIDENT MEMORY DEVICE WITH NO SEPARATE INHIBIT OR SENSING LINE

Karl Illenberger, Munich, Germany, assignor to Siemens Aktiengesellschaft, a corporation of Germany Filed Sept. 2, 1966, Ser. No. 576,896
Claims priority, application Germany, Sept. 6, 1965, S 99,267
Int. Cl. G11b *5/00*
U.S. Cl. 340—174 7 Claims

ABSTRACT OF THE DISCLOSURE

A storage arrangement employing magnetic storage elements and operating for both inscribing and reading according to the coincidence principle, having only a single row line and a single column line with each magnetic storage element which are operatively connected over corresponding column and row selection devices, with the voltage occurring during the reading operation at the series connection of a selected line and pertinent selection device being utilized as a read signal.

The invention relates to storage arrangements, or storers operating according to the coincidence principle, which storers have generally been known for a long time. In the best known case of a coincidence-storer, toroidal magnet cores are utilized as storage elements. In this case, the toroidal magnetic cores are arranged in the form of a matrix, i.e., in rows and columns. First of all, each of the magnetic cores is, for the purpose of control, connected with a row line and with a column line. In multidimensional storers, respective corresponding row lines and column lines of all matrix-planes generally are connected in series. In addition thereto, all cores are connected with an inhibit-or information-line common to all magnet-cores of a matrix-plane. By means of this line, there is determined the nature of the information to be inscribed in a magnet-core, as selected by the control of a certain row line and a certain column line. In order to be able to read the information stored in a magnet-core, all magnet-cores of a matrix-plane are, in addition thereto, connected with a reading or sensing line. Because of the multitude of lines interlinked with the magnet-cores, however, expensive and complicated interwoven patterns result. Furthermore, it is disadvantageous with regard to these arrangements that relatively thin wires must be utilized with the very small magnet-cores involved and, consequently, a high power loss and a corresponding large development of heat occur in the inhibit-line. In addition to this, a high internal generator resistance and therewith a small energy utilization results with regard to the read-line which, consequently results in a considerable expenditure for reading amplifiers. Generally it can be stated that with regard to the customary storers operating according to the coincidence-principle, for large storage capacities, the largest portion of the cost resides in the storage block itself, with the cost of the control-means usually being small in comparison. The total costs could be further reduced essentially only by reduction of the cost of the magnet-cores themselves as well as by less expensive—possibly automatic—threading processes.

Consequently, it is the purpose of the invention to create a storer operating according to the coincidence-principle which, with respect to the costs of the storage-elements as well as their wiring, requires less expenditure than in existing storers of this type. According to the invention this is achieved by the fact that each storer element is only connected with one row and one column line, that for the writing-in of an information into a selected storer element the row or column selector arrangement is controlled in dependence upon information and that the voltage occurring in the reading process at the row circuit consisting of a selected row or column line and a pertinent selector arrangement can be utilized as a reading signal.

The most advantageous possibility for the connection of a reading amplifier comprises a parallel connection of this amplifier with the series-connection of a row or column line and the pertinent selection device. However, since the read signal arises on a line which simultaneously carries one of the partial currents required for the selection, it is advantageous to provide an arrangement which, during the reading operation, supplies an additional signal to the reading amplifier, which signal compensates for the interference signal occurring on the selected row or column line. Such an installation may consist of the equivalent of a row or column, or of an additional row or column of storage elements which are respectively selected jointly with the selected row or column. This form of construction for the production of a compensation signal is particularly advantageous.

Further details of the invention are more fully explained by means of the examples of construction illustrated in the drawings wherein like reference characters indicate like or corresponding parts, and in which:

FIG. 1 is a schematic circuit diagram of portions of a storer utilizing the coincidence principle;

FIGS. 2*a–c* illustrate the respective currents appearing on the various lines;

Figure 6A:
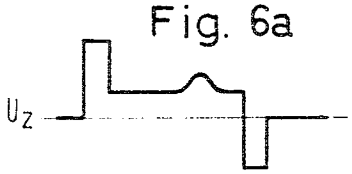
Figure 6B:
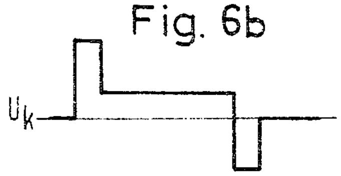
Figure 6C:

FIGS. 6*a–c* illustrate the various voltages appearing at various points of the circuits.

Figure 1:
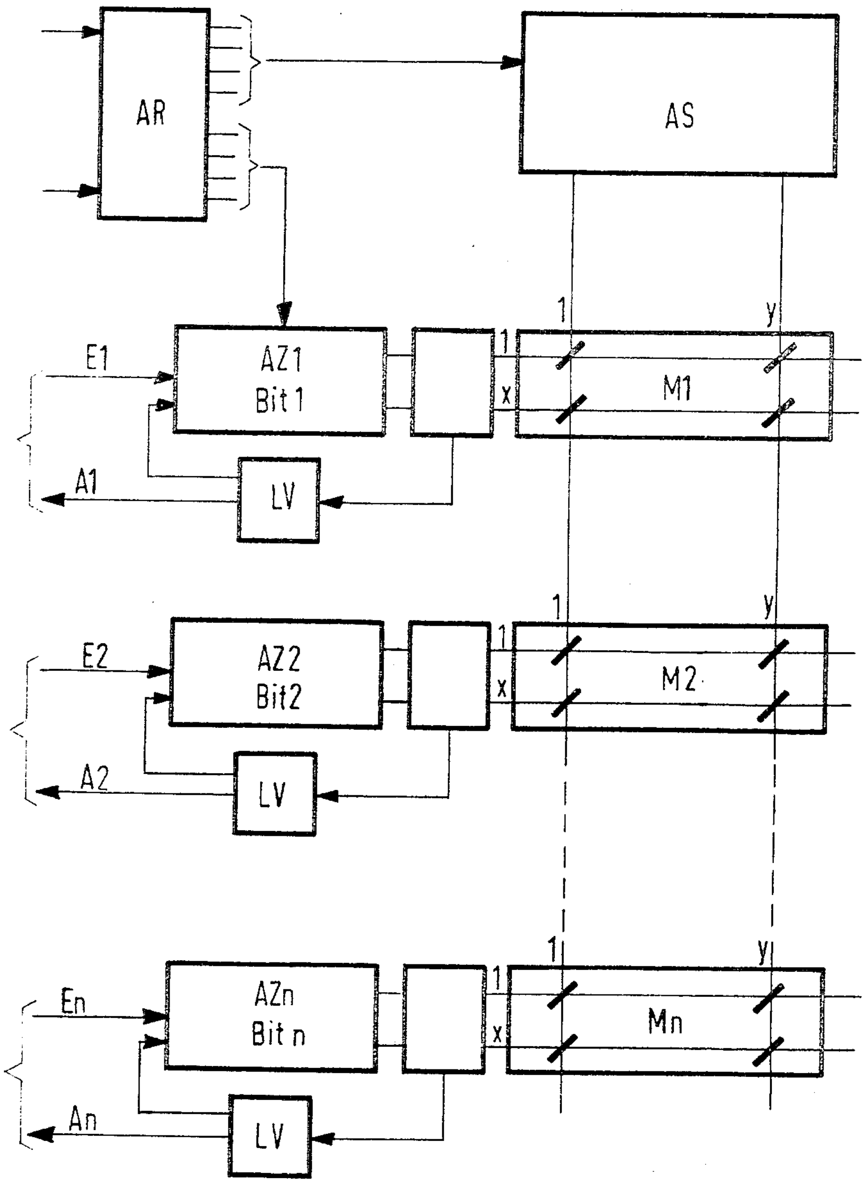

FIG. 1, first of all, generally illustrates the principle of a storage arrangement operating according to the coincidence principle with storer elements, in particular magnet-cores, arranged in rows and columns. Each core of such storage arrangement is connected with only one row line and one column line. For the selection of the individual cores, the selection circuit AS functions for the columns and the selection circuits AZ1, AZ2 to AZ*n* function for the rows in connection with the address register. By means of the selection circuits AZ1 . . . AZ*n* for the rows, the selection and control with respect to a desired line is effected, while the determination as to the nature of the information to be stored in the core is effected by the joint selection of the installations AS and AZ. In contrast to storage arrangements in which each core is, besides being connected with a row line and with a column line, also connected with a reading line and in particular with a so-called inhibit line, in a storer operating according to the coincidence-principle in which each store-element is connected with only one row line and one column line, proper selection devices AZ for the lines must be provided for each matrix-plane since these selection devices must be controlled in dependence upon the information involved in the write-in operation.

The decoupling of the read signal during the reading operation may, as shown in FIG. 1 in principle, take place directly at one of the lines required for the selection of the desired core. In order to prevent the spurious signals occurring during the selection of the desired core, especially when the partial currents required for the coincidence are applied, from becoming too great, it is possible to initially apply the partial current to desired row lines. Following completion of the application of current, and a fading out of the interference voltages on the row line, the partial current is applied to the column line to effect the switching of the selected core. In this manner a separation is obtained of the signal for the core from the voltage pulse occurring at the row line when the current is initially applied. For the decoupling of the read signal at this point, that is, for example, at the row line, different operations are possible and have already been proposed.

However, the type of the read-signal decoupling achieved by the invention is simpler and more advantageous. If there is used for the row control a selection circuit fed by a so-called constant current generator which during the impulse duration shows a voltage drop as small and constant as possible (for example a diode-matrix with saturated address switching transistors) the constant voltage appearing at the selection circuit is added to the voltage-course on the row line. However, the read-signal originating from the core remains unchanged in its shape and can be directly obtained at the constant current generator, or at the series-connections of the selected row or column line and the appropriate selection device. Besides involving a small expenditure, this type of read-signal decoupling has the considerable advantage that through the selection circuit only the selected row line is connected to the reading device. Interference voltages originating from the semi-energized cores of the remaining row lines remain completely ineffective. Consequently considerably smaller requirements may be imposed on the storage elements to be employed, for example, on the magnet cores.

Figure 2A:
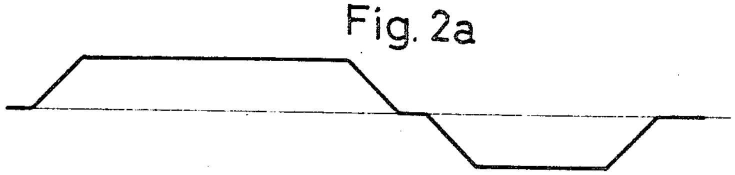
Figure 2B:
Figure 2C:
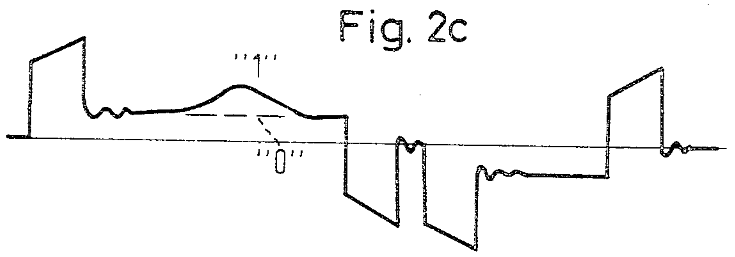

The currents on the selected row and column lines are illustrated in FIG. 2, lines *a* and *b*, while the voltage at the selected row line is illustrated on line *c*.

Figure 3:
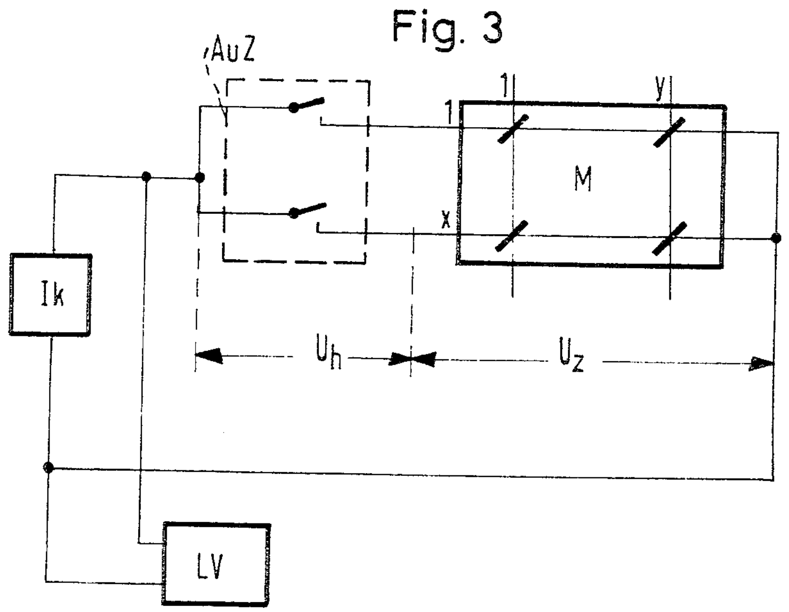
FIG. 3 illustrates a portion of a storer circuit embodying the invention.

FIG. 3 illustrates an arrangement according to the invention, for example, a circuit for one plane of a storage arrangement with several planes, in which the selection of the row lines is achieved by means of a constant current generator I*k*. The figure shows in particular the voltage U*z* and U*h* appearing at the selected row line and the coordinated selection device during the reading operation. In this connection the reading signal originating from the selected core is utilized as a voltage appearing at the series circuit of the selected row or column line and the pertinent selection device.

However, the amplifying of the read signal occurring at the constant current generator I*k* creates considerable difficulties since the voltage pulses occurring in the selected row line when the current is initially applied are much larger than the read signal itself. In addition to this, every disturbing current coupling to the line selection causes an interference voltage in the predominantly inductive row line. Therefore, it is advantageous according to a development of the storer-arrangement according to the invention, to provide an arrangement which, during the reading operation, supplies an additional signal to the read amplifier LV which compensates for the interference signal occurring on the selected row or column line.

Figure 4:
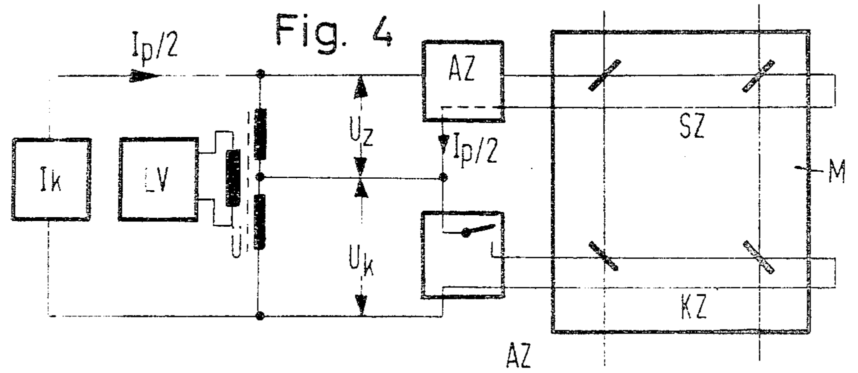
FIGS. 4 and 5 illustrate further embodiments of the invention.
Figure 5:
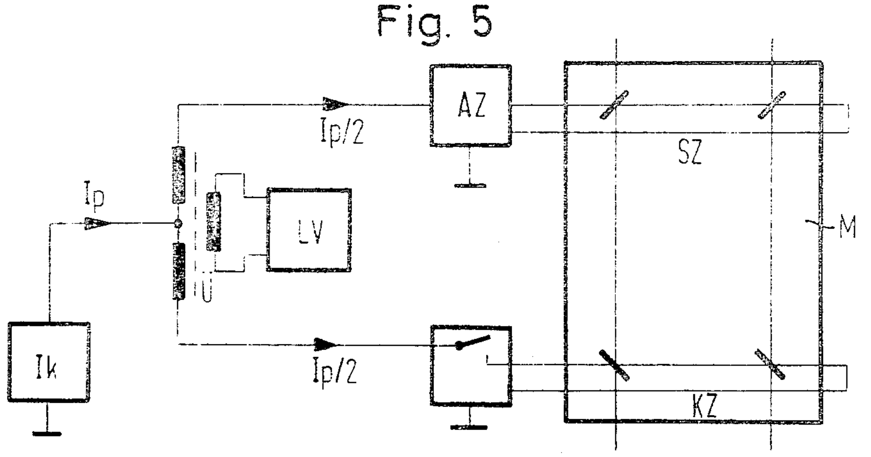

FIGS. 4 and 5 illustrate two particularly advantageous forms of construction for such installations. They consist of an additional row (or column) of cores which are respectively selected along with the selected row or column. FIG. 4 illustrates, in particular, the series-connection of a selected row and a compensation row, while FIG. 5 illustrates the parallel connection of a selected row and a compensation row. The important feature of both forms of construction that the voltages occurring at the selected row line and at the compensation line are subtracted. This may, for example, be achieved by means of a difference-transformer Ü.

FIG. 6, finally, illustrates on line *a* the voltage course appearing on the selected storage row line, on line *b* the voltage course appearing on the compensation row line, and on line *c* the read signal resulting from the difference-formation of the two voltages of lines *a* and *b*.

It will be understood that variations and modifications may be effected without departing from the spirit and scope of the novel concepts of this invention.

I claim:

1. A storage arrangement operating for both writing and reading according to the coincidence principle, comprising magnetic storage elements disposed in rows and columns, row and column control lines operatively connected with respective corresponding rows or columns of said storage elements, drive means for said row and column lines, column and row selection devices operatively connected to said drive means and the respective lines for connecting said drive means to the row line and the column line of a selected storage element to coincidentally supply pulses to such lines during a reading operation, and means for utilizing as a read signal, subsequent to the dissipation of interference resulting from read current, the voltage appearing on a serially connected selected line and the pertinent selection device as a result of the switching of such selected storage element.

2. A storage arrangement according to claim 1, wherein said read signal utilizing means contains a read amplifier operatively connected in parallel with the series connection of the line involved and particular selection device.

3. A storage arrangement according to claim 1, wherein said read signal utilizing means contains means operatively connected to the read amplifier which, during the reading operation, supplies an additional signal which compensates for and thereby effects said dissipation of interference occurring on the corresponding selected line.

4. A storage arrangement according to claim 3, wherein said means for the production of the compensation signal comprises an equivalent of the corresponding line of magnetic storage elements.

5. A storage arrangement according to claim 4, wherein said means for the production of the compensation signal comprises an additional line of storage elements which are controlled with the particular selected line.

6. A storage arrangement according to claim 5, wherein the line of storage elements producing the compensation signal is operatively connected in series with the cooperable selected line.

7. A storage arrangement according to claim 5, wherein the line of storage elements producing the compensation signal is operatively connected in parallel with the cooperable selected line.

References Cited

UNITED STATES PATENTS

| | | | |
|---|---|---|---|
| 3,027,546 | 3/1962 | Howes et al. | 340—174 |
| 3,134,096 | 5/1964 | Bartkus et al. | 340—174 |
| 3,119,025 | 1/1964 | Lourie et al. | 340—174 |
| 3,209,337 | 9/1965 | Crawford | 340—174 |
| 3,289,184 | 11/1966 | Brown | 340—174 |

BERNARD KONICK, Primary Examiner

STEVEN B. POKOTILOW, Assistant Examiner